3,550,002
PULSAR COMMUNICATION SYSTEMS
Arnold A. Shostak, Arlington, Va., and Ronald R. Troutman, Essex Junction, Vt., assignors to the United States of America as represented by the Secretary of the Navy
Filed Feb. 25, 1969, Ser. No. 802,084
Int. Cl. H04k 1/02
U.S. Cl. 325—32      2 Claims

ABSTRACT OF THE DISCLOSURE

There are disclosed arrangements which utilize the signal energy from pulsars to accomplish, for example, the synchronous operation of widely spaced electronic components or the secure transmission of signal information.

---

Figure 1:
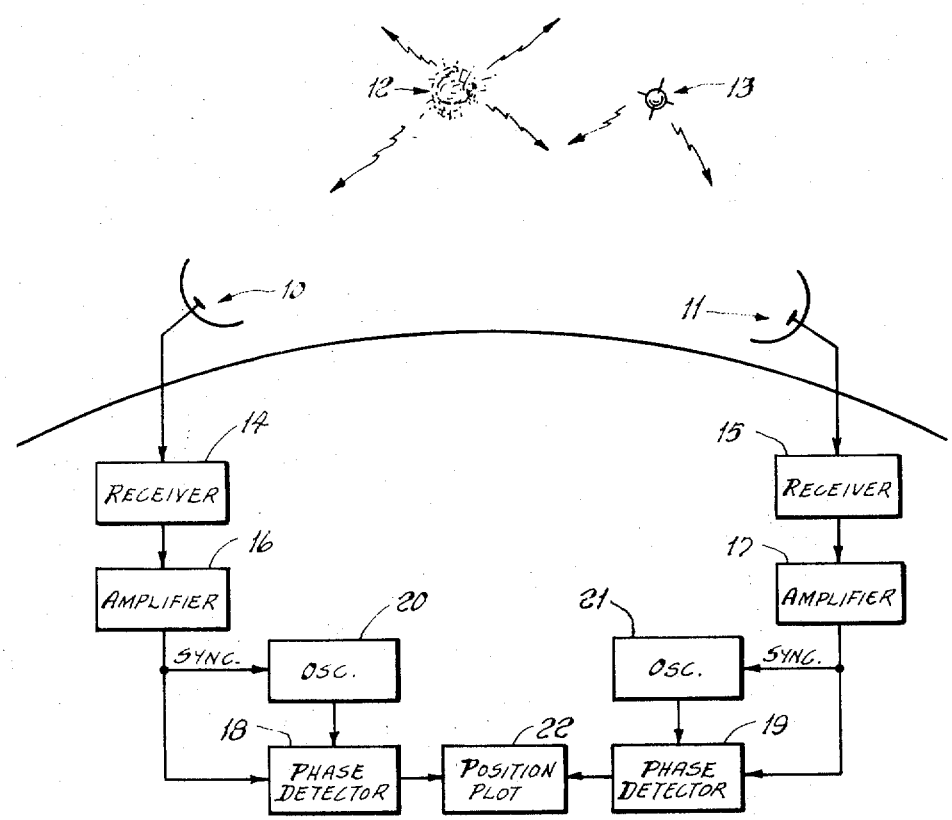

The invention described herein may be manufactured and used by or for the Government of the United States of America for governmental purposes without the payment of any royalties thereon or therefor.

The present invention relates generally to electronic control arrangements and, more particularly, to apparatus for and methods of synchronizing electronic devices, such as, receiving antennas, which are located at two or more widely separated, geographical locations.

There are a wide variety of electronic control systems, such as time display, pulse navigation, long base-line interferometers, and radar countermeasure circuits, which require synchronizing signals for their proper operation. In the Loran navigation system, for example, the various transmitters of the network must radiate their identifying pulse trains at extremely precise times during their operational cycles. Any deviation in the time of transmission introduces an appreciable error in the system. One way of accomplishing this synchronization is by an ultra-stable master oscillator which must be brought to each location. This transportation, of course, is expensive and oftentimes impractical. Also, since the local timing standard of the system is subject to continuous drift, this comparison must be made periodically. The same synchronization problem is also present in the operation of large base-line microwave interferometers where the receivers are located at widely spaced geographical locations.

Pulsating radio sources, or so-called "pulsars," have recently been observed both in the UHF and S-bands of the spectrum. The signals from these pulsars have extremely regular repetition periods. For example, pulsar C.P. 1919 has a period of 1.3373008 secs.; that of C. P. 0834, 1.2737620; and that of C.P. 1133, 1.87911019; all plus or minus $3 \times 10^{-7}$.

Since these pulsars are remote electromagnetic energy sources, they may be simultaneously observed at widely spaced receiving stations equipped with suitable antennas. These antennas may be programmed to track a particular pulsar or shift from one pulsar to another to insure the continuous availability of a suitable signal from these extraterrestrial sources.

It is accordingly a primary object of the present invention to provide a method for accomplishing synchronous operation of electronic devices which makes use of the radiation emanating from pulsars.

Another object of the present invention is to provide a method of synchronizing electronic circuits which utilizes electromagnetic signal information originating from one or more extraterrestrial radio sources.

A still further object of the present invention is to provide an arrangement for maintaining phase coherence between elements of an antenna interferometer, thus permitting detection and precision tracking of remote radiating sources such as satellites.

Figure 2:
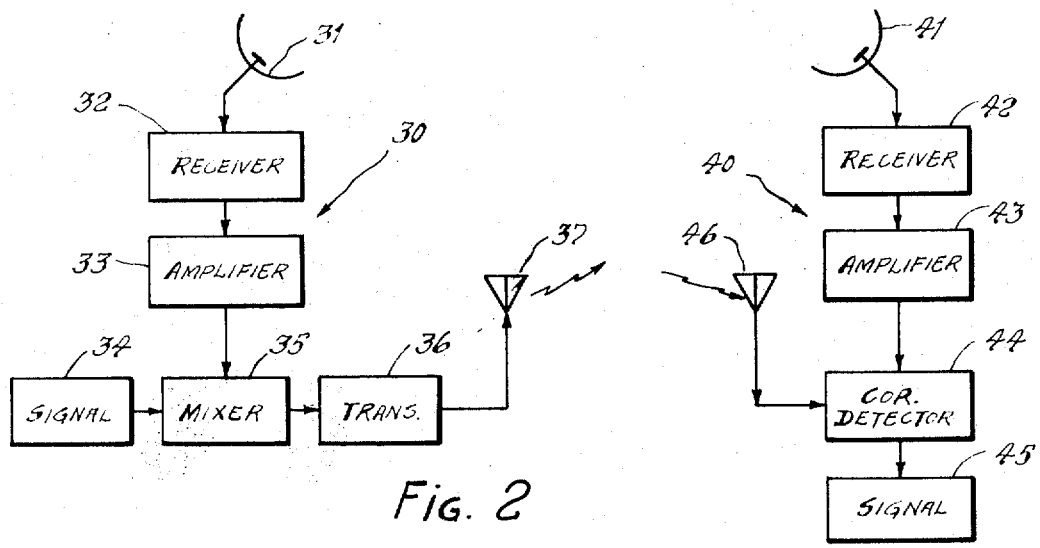

Other objects, advantages and novel features of the invention will become apparent from the following detailed description of the invention when considered in conjunction with the accompanying drawings wherein:

FIG. 1 schematically illustrates one arrangement for utilizing pulsar signals in an antenna interferometer having a large base line; and FIG. 2 illustrates a communication system where the pulsar signal is utilized to achieve secure communication between a pair of stations.

Referring now to FIG. 1 of the drawings, a pair of steerable antennas 1 and 2 of a long base-line microwave interferometer are oriented at one time during their operation to receive electromagnetic signals originating from a predetermined remote pulsar. This pulsar may be C.P. 1919, for example, whose period is 1.3373008 secs.

The signals simultaneously detected by these antennas are coupled to receivers 14 and 15 at the two sites, and the outputs of these receivers are suitably amplified in appropriate circuits 16 and 17. These amplifiers are arranged to control local free-running oscillators 20 and 21 whose instantaneous phase is precisely regulated thereby. Any drift, for example, in the oscillator signals at each site is recognized by an appropriate detecting system, and the magnitude and direction of the resulting error signal is used to return the oscillator back to its proper condition. Circuits and techniques for achieving this control are well known in the art.

It will be appreciated that the pulses appearing in the outputs of amplifiers 16 and 17 at each site, without further signal processing, may be used as synchronizing signals for any appropriate purpose. In this respect, the period of these pulses is, of course, invariably fixed by the characteristics of the particular pulsar 12 then under observation. If desired, these pulses may be fed to multiplying circuits to increase or decrease their repetition rate. If such a conversion is desired or utilized, the new repetition rate of these pulses will, of course, be as stable as the pulsar from which they are originally derived. This stability may be in the order of one part $10^7$.

After oscillators 20 and 21 have been synchronized by the pulsar, the antennas can then move off this source and track any other extraterrestrial radiating source such as satellite 13 to determine its precise location. In this case, antennas 10 and 11 serve as part of a microwave interferometer, and their output signals, after reception and amplification, pass to suitable phase detectors which have as their other input signals from the now stabilized local oscillators 20 and 21. Each phase difference so determined may be sent or otherwise processed at 22 to obtain a position plot.

Since each pulsar can be observed throughout a hemisphere of the earth surface because of their remoteness, calibration signals may be generated according to the system of FIG. 1 at any number of points within this area. The antennas may be shipborne, airborne or ground-base.

The arrangement of FIG. 1 can provide a time standard from the pulsar source which may be simultaneously observed at widely different geographical locations. The signal available at the various amplifiers may be fed to pulse counters to obtain the clock pulses. Each pulse counter, in effect, would multiply the pulse rate of the pulsar by a known period to produce the desired clock pulses.

The availability of the pulsar signal and its stability make it particularly useful in security communications systems. Each pulse may be used as a means for masking or coding the message signal.

In FIG. 2 a transmitting station 30 equipped with a tracking antenna 31 for observing a particular pulsar utilizes the signal so detected as one input to a mixer 35 which has as its other input a message signal 34. The output from mixer 35 modulates or otherwise controls transmitter 36 which radiates the encoded signal via a suitable antenna 37 towards a remote receiving station 40. This station, too, has a tracking antenna 41 which is simultaneously observing the same pulsar. The pulsar signal available at the output of the amplifier 43 at this station is fed to a correlation detector 44 which has as its other input the encoded signal picked up by receiving antenna 46.

If the pulsar signal received at station 30 is $f_1(t)$ and the message signal is $S(t)$, the signal received by antenna 46 will be $S(t)+f_1(t)$. This signal is correlated with $f_2(t)$, the pulsar signal detected by antenna 41 at station 40. The results of this operation is $$(S+f_1)*f_2 = S*f_2 + f_1*f_2$$

where the asterisk represents correlation. If the autocorrelation of the pulsar signal is substracted off or if the statistics of $S(t)$ are made such that the cross-correlation term is much larger than the autocorrelation term, only the first term $S*f_2$ is left. Since $f_2$ is available and known at the receiving site, any conventional signal processing can be used to extract the message signal $S(t)$ therefrom.

If the wave form characteristics of the pulsar change slightly, there is no degradation of the system since $f_1(t)$ and $f_2(t)$ are changed simultaneously and in a similar manner. It would be pointed out that the slight delay brought about by the finite transmission time between stations 30 and 40 may be readily compensated for by adding an appropriate signal delay means anywhere between tracking antenna 41 and the correlation detector 44.

What is claimed is:
1. A communication system for achieving secure signal transmission between a pair of locations, comprising:
    means at said locations for simultaneously receiving signals from a particular pulsar;
    means at one of said locations for encoding an information signal with said pulsar signals and for transmitting the encoded signal;
    means at the other of said locations for receiving said encoded signal; and
    means for processing said encoded signal with said pulsar signals to reproduce said information signal.
2. In a method for achieving secure signal transmission between a first and second location, the steps of:
    coding an information signal available at said first location with particular pulsar signals from a preselected pulsar;
    transmitting said encoded signal to said second location;
    receiving said encoded signal at said second location; and
    decoding the received signal by utilizing the same particular pulsar signals from said preselected pulsar.

References Cited
UNITED STATES PATENTS

| | | | |
|---|---|---|---|
| 3,137,854 | 6/1964 | Anderson. | |
| 3,171,126 | 2/1965 | Wiley | 343—100 |
| 3,263,230 | 7/1966 | Greenberg | 343—100 |

RODNEY D. BENNETT, Primary Examiner

R. E. BERGER, Assistant Examiner

U.S. Cl. X.R.

325—58; 343—113